Sept. 16, 1969　　　KATSUJI HIRAHARA　　　3,467,156
FRUIT PEELING METHOD
Original Filed April 16, 1965　　　2 Sheets-Sheet 1
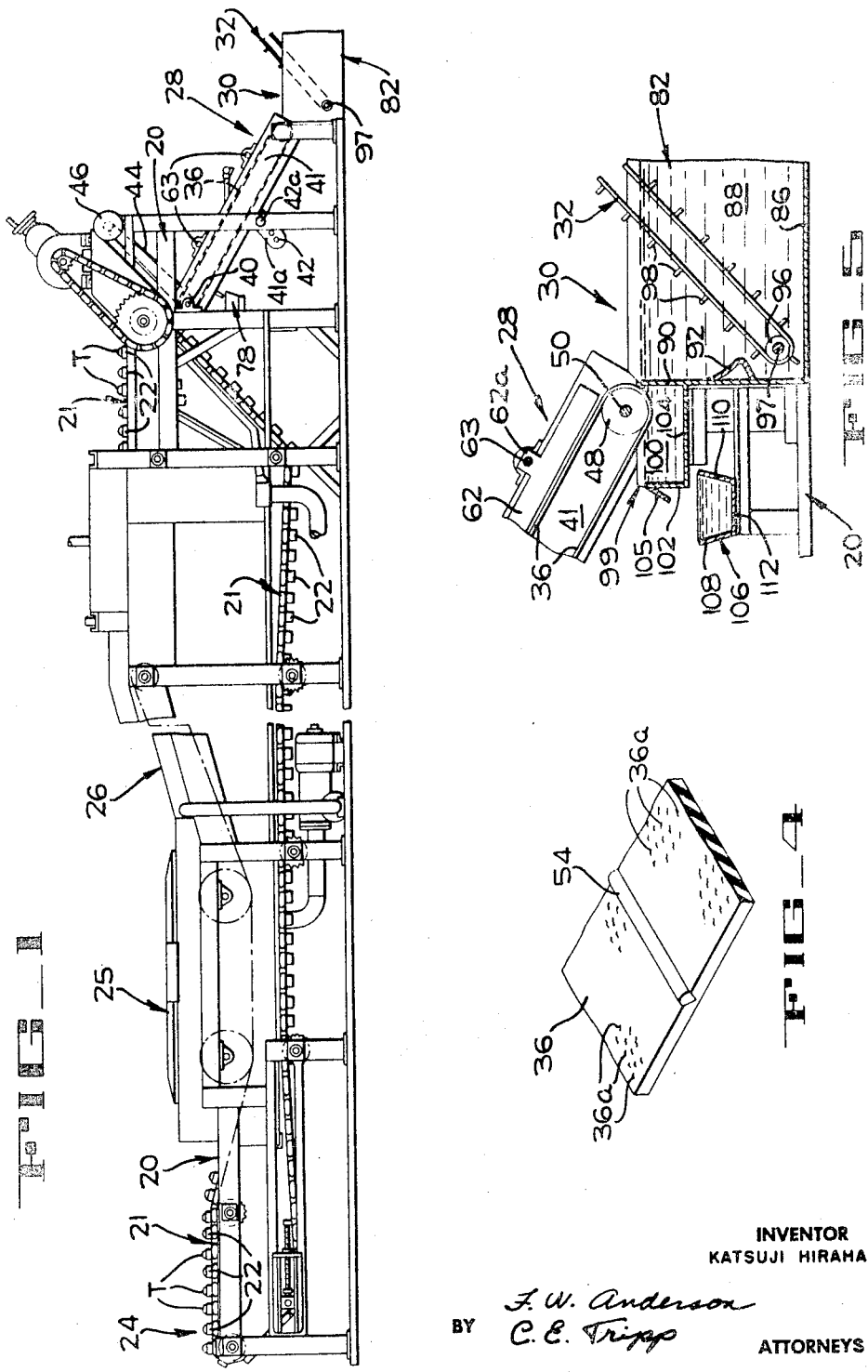
INVENTOR
KATSUJI HIRAHARA
BY F.W. Anderson
C.E. Tripp
ATTORNEYS

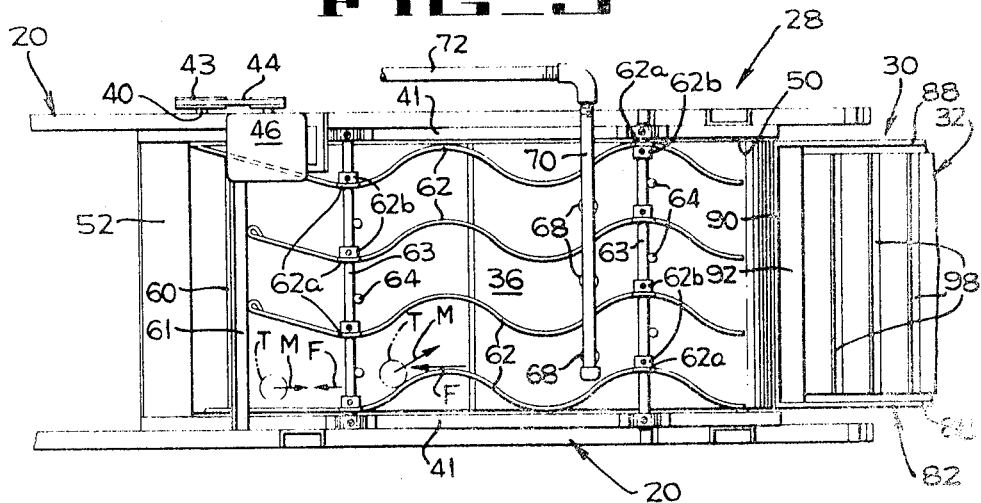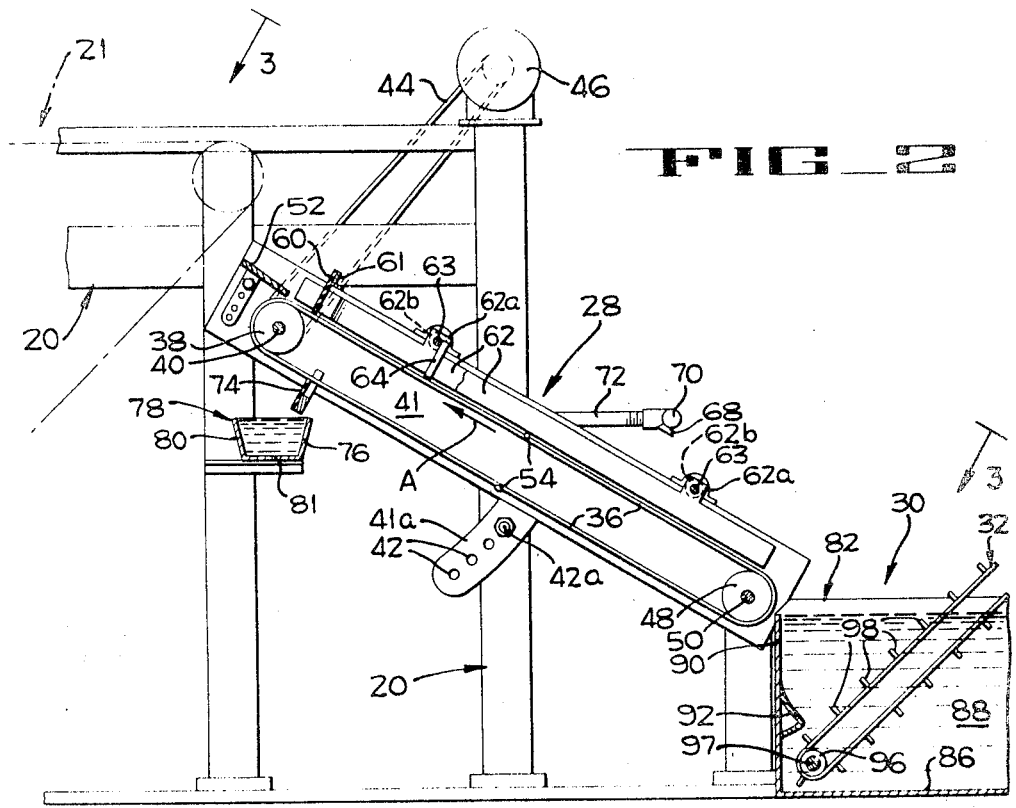

United States Patent Office 3,467,156
Patented Sept. 16, 1969

3,467,156
FRUIT PEELING METHOD
Katsuji Hirahara, San Jose, Calif., assignor to FMC Corporation, San Jose, Calif., a corporation of Delaware
Original application Apr. 16, 1965, Ser. No. 448,785, now Patent No. 3,352,338, dated Nov. 14, 1967. Divided and this application Nov. 1, 1967, Ser. No. 703,490
The portion of the term of the patent subsequent to Aug. 13, 1985, has been disclaimed
Int. Cl. B02c *17/16, 11/08, 23/06*
U.S. Cl. 146—226                          2 Claims

ABSTRACT OF THE DISCLOSURE

Caustically treated tomatoes are peeled by rolling them down an upwardly moving, endless roughened surface while successively imparting forces having lateral components to the tomatoes.

---

This is a division of application Ser. No. 448,785, filed Apr. 16, 1965, now patent 3,352,338.

This application claims a skin removing method which differs from the method claimed in the copending divisional application, Ser. No. 630,042, filed Apr. 11, 1967, now Patent No. 3,396,769, issued Aug. 13, 1968 in that the method claims in this application include the step of imparting lateral forces to the fruit, and also include the step of dropping the peeled fruit into a tank of water.

This invention relates to a method for processing fruit, and more particularly relates to a method for removing the caustically treated skins from fruit, such as, tomatoes.

Fruit, such as tomatoes, have relatively soft bodies surrounded by relatively thin fragile skins, and must be delicately handled to avoid damaging the bodies or meat portions of the fruit. Caustically treating the tomatoes leaves the fruit with a loosened skin that is readily removable by contacting or brushing against roughened surface. Normally, regular tomatoes are first subjected to a coring and trimming operation wherein parts of the skin are cut away making further removal of the cut and caustically treated skin easily accomplished.

With the advent of improved, relatively coreless varieties of tomatoes, such as the VF–145 and its hybrid forms, Italian pear-shaped, 131 oblongs and other types, it became necessary to modify the peeling operation since the tomatoes were no longer acted upon by a coring unit. In other words, since several of the more recent varieties of tomatoes have small cores, if any, the tomatoes leaving the caustic solution are no longer subjected to a coring and cutting operation, making the subsequent peeling of the skins more difficult.

It is an object of the present invention to provide an improved method for removing the caustically loosened skins of the relatively coreless variety of tomatoes.

It is another object of this invention to provide a method for removing the loosened skins of tomatoes which have not been previously cut by a coring operation.

It is another object of this invention to prevent skins dislodged from the tomatoes from entering a rinse tank.

In principle, the tomatoes with their loosened caustically treated skins are guided onto an inclined, moving, roughened belt where the tomatoes are rolled over the belt. As the tomatoes roll over the belt, they are contacted by the roughened surface and the skins are peeled away from the body of the tomato. Baffles are placed in the path of the rolling fruit to impede their travel and thus lengthen the itme of contact with the belt, to further increase the peeling action due to the tomatoes striking the baffles, and to change the direction of the body of the tomato with respect to the friction force applied to the skin by the belt.

The invention will best be understood by referring to the following detailed description and the accompanying drawings in which:

FIGURE 1 is a diagrammatic side elevation of one processing line of a caustic fruit treating machine incorporating the skin-removal apparatus of the present invention.

FIGURE 2 is an enlarged diagrammatic longitudinal vertical section of the skin eliminating unit shown at the right hand end of the machine of FIGURE 1.

FIGURE 3 is an enlarged, diagramming plan of the skin eliminating section of the processing line taken along the lines 3—3 shown in FIGURE 2.

FIGURE 4 is an enlarged isometric of a portion of the endless belt shown in FIGURE 3.

FIGURE 5 is a diagrammatic longitudinal section, similar to FIGURE 2 but with parts broken away, showing a modified form of the skin eliminating unit.

In general, the tomato processing machine comprises an elongated frame support structure 20 on which is mounted an endless chain conveyor 21 (FIG. 1) having an upper run movable toward the right, as shown in FIGURE 1, to carry tomatoes T, that are disposed in cups 22, through a series of processing stations. At a loading station 24, tomato is placed in each cup. As the tomato is moved to the right, it is carried into a tank 25 in which it is treated for a predetermined time with a causic solution, such as, lye. After leaving the lye tank 25, the tomato is carried upwardly inside an inclined housing 26 in which excess lye is drained from the tomato and the tomato is exposed to a steam atmosphere for a fixed period of time during which the lye on the skin penetrates to the desired depth to effect loosening of the skin from the flesh of the tomato body. The steam atmosphere in the housing 26 also raises the temperature of the tomato skin to a predetermined optimum peeling temperature. After leaving the housing 26, the tomato is carried by the chain conveyor 21 to the skin eliminating section 28 where the skin is removed from the fruit portion of the tomato. Upon leaving the skin eliminating section, the peeled fruit is passed through an immersion section 30 where it is rinsed and transferred by a conveyor 32 to a trimming station.

With the exception of the skin-eliminating section 28, the above-mentioned members of the processing line are well known in the art, and a further description may be found by referring to the Creed et al. Patent No. 3,096,800 and, accordingly, the description of the members in said patent is incorporated by reference in the present specification.

The skin eliminating section is best shown in FIGURES 2 and 3 and comprises an endless belt 36 trained around a horizontal drive roller 38 which is keyed on an upper shaft 40. The shaft 40 is journalled for rotation in the frame 20 and in a pair of spaced side plates 41 in a well known manner and has mounted on one end a driven pulley 43 (FIG. 3). Each side plate 41 is provided with a protruding bracket 41a. The brackets 41a have a plurality of holes 42 spaced along an arc relative to the shaft 40. To attain a desired inclination of the belt 36, selected holes in each side plate are aligned with holes in the frame 20 and bolts 42a are passed therethrough and securely fastened by nuts in a well known manner. The driven pulley 43 is connected by means of a belt and pulley drive 44 to the rotary shaft of a variable drive electric motor assembly 46, such as a U.S. Varidrive Motor sold by U.S. Electrical Motors, of Los Angeles, Calif. The belt 36 is also trained about a horizontal idler roller 48 which is keyed on a shaft 50. The shaft 50 is journalled for rotation in the side plates 41 at a lower elevation than the shaft 40 in a manner such that the upper run of the belt 36 travels upwardly, as indicated by arrow A, in a longitudinal inclined path. Tomatoes being advanced by the conveyor 21 are dropped onto a flat metal chute 52 which is adjustably mounted to the frame 20 above the roller 38 by any suitable means. The chute 52 guides the tomatoes onto the upwardly moving upper run of the belt 36. The distance each tomato is dropped from the conveyor 21 to the chute 52 may be varied as desired by adjusting the height of the chute; however, it has been found that a distance of several inches is desirable to partially break the loosened skin so as to assist in the subsequent peeling operation. In addition, the surface of the chute could be provided with a roughened rubber surface to increase the breaking of the skin due to the drop.

The belt 36 may be made of any well known flexible synthetic material which is provided with a nibbed, dimpled or otherwise roughened surface 36a which retards sliding of the fruit and aids in breaking or cracking the skin. A typical belt which has proved satisfactory is a Sno-Flake, 3-ply belt made of neoprene and manufactured by the Haultain Champion Co., Inc., of Oakland, Calif. To increase the tumbling action of the tomatoes traveling down the inclined upper run of the belt 36, a plurality of transverse rubber strips 54 (FIG. 4) are vulcanized or otherwise fastened to the outer surface of the belt 36 in a manner so as to impart an additional rotational movement when the strip is carried upwardly by the belt and strikes the tomato. The belt applies a frictional force to the skin of the tomato which tears the skin from the body of the tomato. The rotational or spinning action of the tomato flings the broken skin outwardly in sheets away from the main body of the fruit. The skins subsequently mat or adhere to the belt. As a result, the skins are pulled in a direction opposite to the downward path of travel of the tomato which increases the skin peeling action.

Interrupting or delaying means are provided above the belt 36 and in the path of the tomatoes rolling down the upper run thereof and, as best shown in FIGURES 2 and 3, comprise a flexible curtain 60, a set of wavy metal baffles 62 and a plurality of metal pins 64. The curtain, baffles and pins are all disposed normal to the upper run of the belt 36 and are spaced a distance therefrom such that they do not contact the belt but are still in the path of travel of the fruit tumbling downwardly thereon. The curtain 60 is mounted on a transverse angle bar 61, which is fastened on the frame 20 by any suitable means, and is made of a highly flexible material, such as rubber. The curtain 60 serves to momentarily halt the travel of the tomato which is received from the chute 52. This permits the roughened surface of the belt to act on the tomato and begin its tumbling and tearing action. The curtain 60 is separated from the belt a distance sufficient to halt the tomato only temporarily and, as the tomato passes beneath the curtain, it is rapidly tumbled by the inclination of the upper run of the belt 36 and by contact with the upwardly moving roughened surface 36a and the rubber strips 54.

As the tomatoes travel downwardly along the inclined path, they tumble against the undulating upstanding baffles 62 which partially impede their downward travel. The baffles are provided with tabs 62a which are fastened, in a position overlying the belt, to transverse bars 63 by collars 62b formed on the tabs and secured to the bars. The bars 63 are mounted on the frame 20 by any suitable means. The baffles provide a succession of fruit abutment faces that are inclined to the direction of belt travel and prevent the tomatoes from traveling along a straight path and thus extend the time in which they are in contact with the roughened surface of the belt 36. The baffles also cause more vigorous contact between the tomatoes and the belt and thus increase the efficiency of the peeling operation. Furthermore, each time a tomato strikes a baffle the frictional force applied to the skin by the belt is in a different direction, since the tomato is deflected across the moving belt rather than merely traveling in one direction with respect to the direction of belt movement. Since the baffles 62, in the form illustrated, are undulating and extend generally longitudinally of the belt 33, the fruit abutment faces provided by the baffles are of limited lateral extent, so that although these faces have the skin removal action just described, the fruit is permitted to tumble on down the belt at a relatively rapid rate, ricocheting off successive faces on the way down. In FIGURE 3 a typical illustration is shown in which a tomato T is shown being deflected by a baffle 62 across the belt 36. The direction of travel of the tomato is indicated by an arrow M whereas the direction of the frictional force as applied to the skin of the tomato by the belt is indicated by an arrow F. When the tomato leaves the baffle the direction of the friction force is at an angle with respect to the direction of tomato travel and more effectively removes the tomato skin.

Similarly, the pins 64 which are positioned between the baffles 62, further impede the travel of the tomatoes along the inclined path. The pins 64 are fastened on the transverse bars 63 as by welding. The purpose of the pins 64 is, likewise, to extend the length of time in which the roughened surface of the belt may contact the loosened skin of the tomato. By the time the tomato reaches the lower end of the belt 36, adjacent the immersing unit 30, substantially all the skin has been peeled from the fruit portion of the tomato.

As is best shown in FIGURES 2 and 3, a plurality of nozzles 68 are connected on a transverse water pipe 70 which is connected to the frame 20 in a position overlying the belt, by any suitable means. The pipe 70 is connected by a conduit 72 to a source of water under pressure. The nozzles 68 direct a spray of water on the tomatoes traveling down the belt, rinsing the peeled tomatoes and applying a thin film of water onto the surface of the belt 36. As the skins are disengaged from the body of the fruit, the peels adhere to the belt and to the thin film of water and are carried out of the path of the body portion of the tomato.

Positioned beneath the roller 38 and in a position to engage the outer surface of the belt 36 is a flexible resilient scraper 74 which is mounted on the frame 20 above the side wall 76 of a flume 78. The flume 78 includes another side wall 80 and a bottom wall 81 secured to the frame 20. The bottom wall 81 is connected in fluid tight relation to the side walls 76 and 80. The scraper 74 engages the peelings, which are partially floating on the thin film of water and carried by the outer surface of the belt 36, and deflects them into the flume 78 where they are subsequently discharged as by flushing with water. Consequently, the outer surface of the belt 36 is substantially cleared of peelings prior to its travel along the upper run. Since it is imperative that the skins of the fruit be contacted by a roughened surface, this clearing action by the scraper 74 maintains the roughened surface of the belt effective for removing the skins from the tomatoes.

The immersion section 30 will now be described and as best shown in FIGURE 2 comprises a tank 82 positioned below the roller 48 and having a bottom wall 86, two upstanding side walls 88 (FIG. 3), and two upstanding end walls 90, only one being shown. The tank is filled with water from a source, not shown, and serves to rinse the substantially peeled tomatoes prior to a further processing step. The tomatoes passing along the baffles 62 are discharged into the tank 82 at the lower end of the belt 36 and are deflected by a plate 92, fastened to one of the end walls 90, onto the upwardly inclined conveyor 32.

The belt of conveyor 32 is trained about an idler roller 96 that is keyed on a shaft 97 which is journaled on the frame 20 and about an upper power-driven drive roller, not shown. A plurality of appendages or shelves 98 are provided on the outer surface of the conveyor 32 in upstanding relation thereto in a manner well known in the art. As the tomatoes are deflected by the plate 92, they are carried upwardly by the appendages on the conveyor 32 and moved to a subsequent handling station, not shown.

In the operation of the device, the tomatoes which have been treated in the tank 25 and the inclined portion 26 are carried by the conveyor 21 to the skin eliminating section 28. The tomatoes are dropped from the conveyor 21 and strike the chute 52, where an initial breaking of the skin occurs, and are then deflected onto the upper run of the belt 36. Due to the inclination of the upper run of the belt 36, the tomatoes begin to slide or tumble down the inclined path until they are engaged by the curtain 60 and momentarily stopped until the moving roughened surface of the belt 36 causes them to begin a pure tumbling action. As the tomatoes leave the curtain 60 they are tumbled along the inclined path and delayed by the baffles 62 and the pins 64 so that the roughened surface of the belt 36 has sufficient time to engage the loosened skins of the tomatoes and remove them from the fruit portion. Each time the tomatoes strike a baffle and are deflected in a different direction they travel across the moving belt at a different angle resulting in a change in direction between the motion of the tomatoes and the frictional force as applied by the belt. The relative change in direction between the tomatoes and the moving belt causes a more vigorous and rapid peeling action. Also, upon each change of direction the tomato is slowed, however, since the belt is moving at a constant fast speed the belt further tends to move the skin faster than the body of the tomato and thus separate the skin from the tomato.

The inclination of the upper run of the belt 36 and the speed with which it travels may be varied depending upon the type of fruit being peeled. In one arrangement for the VF–145 variety tomato, the optimum conditions were an angle of 28 degrees, using an eight foot rolling section for the upper run of the belt 36 and a belt speed of 300 feet per minute. The more baffles used, the faster the speed of rotation of the belt, and the greater the angle of inclination of the belt, all are factors which increase the amount of contact by the roughened surface of the belt and cause more vigorous peeling action. Consequently, should the fruit being processed have a skin which is not readily removed, the adjustment of any one, or all, of these three aforementioned features may be changed to provide a more extensive and vigorous contact. Conversely, when the skin of the fruit is very fragile and easily removable, the belt angle and speed may be decreased. The above three features, namely, the belt angle of inclination, the belt speed, and the number of baffles are not critical; however, as aforementioned, there are optimum conditions for each different variety of fruit being peeled.

Upon leaving the belt 36, the peeled tomatoes fall into the immersion unit 30 where any remaining traces of lye or loose bits of peel are removed. The tomatoes are then carried by the conveyor 32 to another station in the processing line, not shown, where a subsequent operation, such as a final trimming and packing is performed.

A modified form of the belt cleaning portion of the eliminator is shown in FIGURE 5. In this embodiment, the flexible scraper 74 and the flume 78 are removed. As a substitute therefor, two additional side walls, only one being shown as at 100, are connected to the end wall 90 of the tank 82. An additional end wall 102 is added connecting the side walls and a bottom wall 104 in fluid tight relation to form a washing tank 99. The end walls 90 and 102, the side wall 100 and the other side wall, not shown, are high enough so as to support a column of water supplied either from a source, not shown, or from the water which spills over the end wall 90, such that the lower portion of the roller 48 and the belt 36 are immersed in the water column. The end wall 102 is slightly lower than the end wall 90, and is provided with a spillway 105 which guides the overflow of the water into the flume 106. The flume 106 is substantially identical to the previously described flume 78 of the preferred embodiment. It should suffice to say that the flume 106 also is provided with a pair of inclined side walls 108 and 110 which are connected by a bottom wall 112. The bottom wall 112 is also fastened to the frame 20 at an angle such that peelings which are washed into the flume over the spillway 105 may be flushed to a disposal area.

The operation of the modified embodiment is identical to the preferred embodiment with the exception that instead of the peelings being scraped from the belt by the rubber scraper 74, they are retained on the lower run of the belt 36 and pass into the column of water supported in the tank 99. As the peelings are carried into the column of water they are washed from the belt 36 and float over the spillway 105 into the flume 106, thus leaving the belt in a substantially cleaned condition as it begins the upper run.

From the foregoing description it will be apparent that the present invention provides a method capable of efficiently and inexpensively removing the skins from lye treated fruit, such as tomatoes. It should be further evident that the arrangement reduces the quantity of water normally used for peeling tomatoes.

It will be understood that the principles of the invention are also applicable for tomatoes which have cores and are first subjected to a coring or cutting operation before being peeled or for tomatoes which have cores but are not first subjected to a coring or cutting operation. However, since tomatoes which are first cored are weakened structurally, it is necessary to coordinate the speed, angle and length of the belt for less vigorous handling than in the case where coreless or uncored tomatoes are being peeled.

It will be understood that modifications and variations of the invention disclosed herein may be made without departing from the scope of the present invention.

Having thus described the invention, what is claimed as new and is desired to be protected by Letters Patent is:

1. A method of removing the skins from fruit comprising the steps of treating the fruit in a hot caustic bath for loosening their skins, and without further heating of the fruit thus treated, rolling them down an inclined, generally planar, endless roughened surface under the force of gravity while simultaneously moving the roughened surface under the fruit in a direction contrary to said downward rolling motion of the fruit, further prolonging the frictional engagement between the fruit and the roughened surface by successively imparting forces having lateral components in various directions to the leading surfaces of the rolling fruit, maintaining the frictional engagement between the fruit and the roughened surface until the fruit is peeled, and flushing the roughened surface and the rolling fruit for maintaining a film of water over the surface and for dislodging skins from the fruit.

2. The method of claim 1, comprising the steps of dropping peeled fruit from said roughened endless surface into a tank of water, and removing the skins from said endless surface after the peeled fruit have dropped therefrom, to prevent carry over of skins into the tank of water by the endless surface.

References Cited

UNITED STATES PATENTS

| | | | |
|---|---|---|---|
| 501,613 | 7/1893 | Foote | 146—49 |
| 1,394,138 | 10/1921 | Bost et al. | 146—50 X |
| 2,477,006 | 7/1949 | Pierson | 146—50 |
| 2,862,535 | 12/1958 | Wilson et al. | 146—43 |
| 3,024,821 | 3/1962 | Bean | 146—49 |
| 3,246,677 | 4/1966 | Hickey et al. | 146—47 X |

W. GRAYDON ABERCROMBIE, Primary Examiner

U.S. Cl. X.R.

146—50, 231, 232, 241